United States Patent [19]

Jacobone

[11] 4,229,327
[45] Oct. 21, 1980

[54] COATINGS FOR POLYOLEFINIC PRODUCTS AND PRODUCTS COVERED BY SKID COATINGS

[75] Inventor: Donato Jacobone, Milan, Italy
[73] Assignee: Frypan S.p.A., Italy
[21] Appl. No.: 431
[22] Filed: Jan. 2, 1979
[30] Foreign Application Priority Data Jan. 16, 1978 [IT] Italy .............................. 19269 A/78

[51] Int. Cl.³ .............................................. C08L 1/18
[52] U.S. Cl. ....................................... 260/13; 260/16;
260/17 R; 428/413; 428/483; 428/517; 428/532
[58] Field of Search ........................ 260/16 (U.S. only)

[56] References Cited

U.S. PATENT DOCUMENTS

| | | | |
|---|---|---|---|
| 2,872,422 | 2/1959 | Rolle et al. | 260/16 |
| 2,907,722 | 10/1959 | Staicopoulos | 260/16 |
| 4,022,724 | 5/1977 | Kreuder | 260/16 |
| 4,042,539 | 8/1977 | Fanning | 260/16 |

*Primary Examiner*—Edward M. Woodberry
*Attorney, Agent, or Firm*—McGlew and Tuttle

[57] ABSTRACT

A coating composition for polyolefinic films, especially poly-propylene films, which consists essentially of a solution of a dry three-component polymeric system comprising:

(a) a first component consisting of acrylic homopolymers, copolymers or mixtures thereof;
(b) a second component consisting of a polyester resin obtained by condensation; and
(c) a third component consisting of medium or low viscosity nitrocellulose or mixtures thereof.

The coated products and the coating process are also covered.

7 Claims, No Drawings

COATINGS FOR POLYOLEFINIC PRODUCTS AND PRODUCTS COVERED BY SKID COATINGS

BACKGROUND OF THE INVENTION

The present invention relates to new coatings for polyolefinic films, particularly but not exclusively, for polypropylene films and further relates to films and the like covered by said coatings, especially for rendering said films thermosealable by conventional packaging and sealing machines.

Polyolefinic films in general, and isotactic polypropylene films in particular, have experienced in the recent years a notable development especially in the field of sealed bag packaging and in general in the automated packaging field. The present films have been used in particular as replacement of the regenerated cellulose films, generally known as "Cellophane" films, as alternates but also often as substitutes to thin polyvinylchloride films with respect to which they offer numerous advantages.

Cellophane, as is well known, has been up to few years ago one of the most widely used materials in the field of flexible packaging for the food industry.

Often, in order to improve cellophane performance, it is necessary to treat the film with thermoplastic resins which serve to improve the sealability of two or more films with each other in a packaging machine. But, above all, said coatings served to form an effective barrier for gases and water vapor to which all cellulose derivatives are particularly sensitive. The above-described treatment is easily effected utilizing well known systems of coating or the like, using for example coatings of the following compositions:

"Saran"—PVDC (dispersion or solution) and its copolymers
PVC (dispersion or solution) and its copolymers
Nitrocellulose (with various resins)

The application of the coatings described does not present any particular difficulties thanks to the very good thermal properties of the regenerated cellulose.

Plastic films, in general, and in particular mono- or bi-oriented (biaxially drawn) polypropylene films, even though possessing better physico-mechanical characteristics than cellophane are very sensitive to temperatures higher than 110° C. and are less stable thermally than cellophane.

Consequently they are more difficult to heat-seal, requiring special apparatus.

Therefore, the coating of said polypropylene films must, above all, eliminate their thermosealability deficiencies and thus permit the sealing thereof at temperatures lower than those at which the polypropylene may undergo the adverse effects of rippling, tightening, melting, degradations and the like.

To achieve this result, the polypropylene film (hereinafter referred to as "PP films") are coated using procedures similar to those used for cellophane, but modified and improved to account for the different behavior of the material being treated.

Among the materials most widely used for the coating of said films are vinyl resins and their copolymers, vinylicid resins and their copolymers, acrylic resins and their copolymers or mixtures of the above resins in varying proportions. The above resins are applied onto the PP film either as solutions in a suitable solvent or as emulsions.

The major difficulty in coating the PP base film consists in obtaining a good adhesion of the coating to the base film. In fact a routine coating operation could result in very low sealability values due to the delamination of the coating. In order to increase the mechanical resistance of the seals, there are certain treatments to which the film is subjected to before the coating operation. The precoating treatments known at this time are: electric discharge treatment (corona effect), flame treatment, treatment with oxidizing solutions (impractical because of processing difficulties) and, finally treatment with a suitable primer, preferably effected in conjunction with the above-mentioned surface treatments.

The flame or corona treatments are easily performed and have a definite effect in improving the wettability properties of the Base film. Among the primers, the better and most practical, and consequently the one most often used, is a water-soluble polyimine compound, used for some time in the paper industry and in the manufacturing industry (in the production of flexible plastic film articles consisting of combinations of plastic film with aluminum, paper and cellophane).

The techniques of the above-mentioned technologies have already been used in the field of isotatic polyethylene films and there exist, in this regard, some patents to various companies in this field. Among these an Italian patent to Montecatini discloses a process (Italian Pat. No. 717,612, filed on Mar. 16, 1964) for obtaining coated films (called "Moplefan") consisting substantially of a base film of polypropylene high in isotatic content. Said base film is subjected to a flame treatment and to a corona discharge treatment as above described. After said treatment a polyimine based primer is applied on the base film. The treated film is then covered with a coating consisting of a mixture of, substantially, three basic components. In the patent there is claimed the effect of the oxiranic group contained in the epoxy resin in bettering the adhesion of the coatings to the support base.

There are also known other commercial products such as "Prophan" having thermosealability characteristics similar to those of Moplefan.

There also exist alternate processes which utilize different technologies, such as coupling and lamination of thin film, which also require the use of primers, adhesives and/or hot melts for the coupling of said films with a previously extruded film or with a molten layer. Also in this case, the effectiveness of polyimine as an adhesion promoter is known. It must also be precised that the product, in addition to the thermosealability characteristics, must also have other characteristics no less important such as: good optical transparency, no tackiness above 45°/60° C., stability to aging, cohesion of the sealed film immediately after the opening of the sealing bars, easy separation from the sealing bars, minimum value of friction coefficient, low solvent retension, resistance to greases and fats, good printability, impermeability to gases, etc. Furthermore, in applications in the alimentary field, said films must comply with the existing norms in the field. In view of these facts, in the resin compositions there exist, for each type of base formulation, modifiers and additives which must be dosed and chosen as to optimize the distribution of values of the characteristics required for each specific application.

SUMMARY OF THE INVENTION

Taking into consideration all these implications, applicant has studied and developed a resin mixture for coating purposes, alternate to that described in the Moplefan patent (Italian Pat. No. 717,612 filed Mar. 16, 1964), said mixture being characterized by the fact that one of its main components is represented by a saturated or unsaturated polyester-type polymer free of styrene. In particular, such mixture is characterized by the fact it provides the following base composition: acrylic homopolymers and copolymers in various ratios with medium and high viscosity nitrocellulose and polyester resins obtained by condensation.

DETAILED DESCRIPTION OF THE PREFERRED EMBODIMENTS

The products according the present invention, particularly mono-, bi- and non-oriented polypropylene films treated with the coatings of the present invention, are substantially characterized by the fact of providing a first layer of preparation or of adhesion (primer) to which is then applied the actual coating.

Said two covering layers are essentially composed of (all percentages being indicated as weight percentages based on the dry mixture, unless otherwise indicated):

(A) First or primer layer—constituted of alkylimine polymers such as polyethyleneimine, polypropyleneimine or the like.

(B) Second or coating layer—constituted of homopolymers and copolymers based on acrylic, methacrylic, crotonic, itaconic acid and their $C_1$-$C_{14}$ aliphatic esters and their isomers; or with hydroxyalkyl esters of said acids containing from 1 to 12 carbon atoms and having the hydroxy group on a primary or secondary carbon atom, and further with hydroxyalkyl esters derived from hydroxylic polyethers.

For this application the resin mixture is dissolved in suitable solvents such as ketones, ethylene glycol ethers, or acetic acid esters, in a concentration between 20 and 40%.

To better the adhesion of the applied layer in the above-mentioned formulation it is useful to add a polyester-type polymer in a ratio of from 1 to 50%.

The polyesters may be of various types such as, for example, esterification products of phthalic, terephthalic, isophthalic acid and their anhydrides with aliphatic glycols having a $C_2$-$C_8$ chain and their isomers and/or with ethylene glycol ethers such as diethylene or triethylene glycol; the dibasic acids above-mentioned esterified with polyglycols containing 3 or more primary or secondary hydroxy groups, which hydroxy groups may be partially defunctionalized with monocarboxylic acids such as benzoic acid, para-t-butylbenzoic acid, and fatty acids; polyester resins formed totally or partially by basic aliphatic acids having a $C_2$-$C_9$ chain with the above-indicated glycols and polyglycols; polyesters obtained from dibasic and polybasic aromatic and aliphatic acids defunctionalized with mono-functional alcohols and subsequently esterified with glycols and polyglycols defunctionalized with monocarboxylic acids, or substituting part of said glycols with aminoalcohols, such as triethanolamine; polyesters obtained by the condensation between isocyanates or mono-, bi- or polyfunctional isocyanate adducts with glycols and polyglycols eventually defunctionalized as already indicated in the preceding examples; polyesters obtained by the condensation of dibasic aliphatic and aromatic acids or their methyl esters with ethylene oxide or propylene oxide. The coating formulation thus prepared can be further modified by the addition of suitable agents, such as release, antistatic and wetting agents, pigments and fillers, in order to obtain the desired properties for the particular use.

To better the non-adhesion to the thermosealing bars and thus to favor the release of the product from said bars, to the mixture components there is added, according to the present invention, medium and low viscosity nitrocellulose in a ratio varying between 5 and 40%, based on the dry weight of the mixture components.

There now follow the illustrative examples:

EXAMPLE 1

Base film: polypropylene film of high isotactic polymeric content, axially bioriented and surface-treated with an electronic and/or flame system as to obtain a minimum wettability of 36 dynes/cm.

First or primer coat: one of the faces of the film is coated with an aqueous polyimine solution having a 1–2% dry content.

Coating: the layer thus obtained is dried and is then coated with a coating solution of 20–35% polymers in methylethylketone. Said coating solution contains the following types of polymers:

(1) An acrylic copolymer based on methylmethacrylate/butylmethacrylate having a viscosity HU, measured at 25° C. and at a 30% concentration in xylene, equal to 50-150 cps, in a proportion equal to 50-60% of the mixture components.

(2) A polyester resin obtained by the condensation of phthalic anhydride/maleic anhydride in a ratio of 1-1.5 with ethylene glycol, in a proportion equal to 10-20% of the mixture components.

(3) A medium viscosity nitrocellulose in a proportion equal to 20-30% of the mixture components.

Characteristics: after the coating operation, the dried film has the following characteristics:
coating thickness = 1.8–2.0μ
transparency = good (HAZE = 2.0)
sliding qualities = good
sealing = 100 g/cm (T ≈ 120° C.)
adhesion to the hot sealing bar (T = 120° C.) < 100 g/cm

EXAMPLE 2

Base film: polypropylene film of high isotactic polymeric content, axially bioriented, surface-treated with an electronic and/or flame system as to obtain a minimum wettability of 36 dynes/cm.

First or primer coat: one of the two faces of the film is coated with an aqueous polyimine solution having a 1–2% dry content.

Coating: the layer thus applied is dried and then coated with a coating solution of 20–35% polymers in methylethylketone.

Said coating solution contains the following types of polymers:

(1) An acrylic copolymer based on methylmethacrylate/butylmethacrylate having a viscosity HU, measured at 25° C. and at a 30% concentration in xylene, of 50-150 cps, in a proportion equal to 50% of the polymer mixture.

(2) a polyester resin obtained by condensation of phthalic anhydride/and maleic anhydride in a ratio of 1-1.5 with ethylene glycol, in a proportion equal to 20% of the mixture.

(3) An epoxy resin obtained by the condensation of bisphenol A with epichlorohydrin, in a proportion equal to 10–30% of the mixture.

(4) A medium and/or high viscosity nitrocellulose in a proportion equal to 10–20% of the mixture.

Characteristics: after coating the dried film has the following characteristics:

coating thickness = 1.8–2.0μ
transparency = good (HAZE = 2.0)
sliding qualities = good
resistance to sealing = 250–300 g/cm.

The resistance to sealing was measured by examining two coated films sealed with each other at 120° C., with a sealing bars pressure between 1.5 and 2 kg/cm$^2$ and a pressure application time of 1 second.

What is claimed is:

1. A coating composition for polyolefinic products which consists essentially of an organic solution of a dry polymeric system comprising:
   (a) about 50–60 parts by weight of a first component selected from the group consisting of acrylic homopolymers, copolymers and mixtures thereof;
   (b) a second component consisting of a polyester resin obtained by condensation, in a weight percent ratio of about 1–50%; and
   (c) about 10–30 parts by weight of a third component selected from the group consisting of medium viscosity nitrocellulose, low viscosity nitrocellulose and mixtures thereof.

2. The coating composition of claim 1 obtained by dissolving the dry polymeric mixture, in a weight percent ratio of about 20–40%, in a solvent selected from the group consisting of ketones, ethylene glycol ethers, acetic acid esters and mixtures thereof.

3. The coating composition of claim 1 additionally containing additives selected from the group consisting of release agents antistatic agents, wetting agents, pigments, fillers and mixtures thereof.

4. A coating composition for polyolefinic films consisting essentially of an organic solution of a dry polymeric system as follows:
   (a) about 50–60 parts by weight of a methylmethacrylate/butylmethacrylate copolymer;
   (b) about 10–20 parts by weight of a polyester resin obtained by the condensation of phthalic anhydride and maleic anhydride with ethylene glycol; and
   (c) about 20–30 parts by weight of medium viscosity nitrocellulose.

5. The coating composition of claim 4, wherein said polyester resin is obtained by the condensation of phthalic anhydride and maleic anhydride in a ratio of 1–1.5 with ethylene glycol and the amount of said polyester resin equals 20 parts by weight of the mixture.

6. A coating composition for polyolefinic products which consists essentially of an organic solution of a dry polymeric system comprising:
   (a) about 50–60 parts by weight of a first component selected from the group consisting of acrylic homopolymers, copolymers and mixtures thereof;
   (b) about 10–20 parts by weight of a second component consisting of a polyester resin obtained by condensation and
   (c) about 10–30 parts by weight of a third component selected from the group consisting of medium viscosity nitrocellulose, low viscosity nitrocellulose and mixtures thereof.

7. The coating composition of claim 6 additionally containing an epoxy resin obtained by the condensates of biphenol A with epichlorohydrin, in a proportion equal to 10–30 parts by weight of the mixture.

* * * * *